United States Patent
Dau et al.

(10) Patent No.: US 8,410,726 B2
(45) Date of Patent: Apr. 2, 2013

(54) SOLID STATE LAMP USING MODULAR LIGHT EMITTING ELEMENTS

(75) Inventors: Wilson Dau, Calgary (CA); Louis Lerman, Las Vegas, NV (US); Allan Brent York, Langley (CA); Robert Steele, Redwood City, CA (US); Jacqueline Teng, White Salmon, WA (US); George Lerman, Las Vegas, NV (US)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 13/032,510

(22) Filed: Feb. 22, 2011

(65) Prior Publication Data

US 2011/0163681 A1  Jul. 7, 2011

(51) Int. Cl.
  *H05B 37/00* (2006.01)
  *G05B 1/00* (2006.01)
(52) U.S. Cl. ......................... 315/312; 315/307
(58) Field of Classification Search .......... 315/160–161, 315/164, 185 R, 185 S, 200 R, 209 R, 246, 315/291, 292, 307, 308, 312, 314, 316, 317, 315/318; 362/227, 249.01, 249.02, 249.03, 362/249.05, 249.06, 249.07
See application file for complete search history.

(56) References Cited

U.S. PATENT DOCUMENTS

| 4,445,132 A | 4/1984 | Ichikawa et al. |
| 5,884,994 A | 3/1999 | Herst et al. |
| 5,925,897 A | 7/1999 | Oberman |
| 6,087,680 A | 7/2000 | Gramann et al. |
| 6,113,433 A | 9/2000 | Al-Turki |
| 6,270,236 B1 | 8/2001 | Brussog |
| 6,541,908 B1 | 4/2003 | Cheung et al. |
| 6,557,393 B1 | 5/2003 | Gokhfeld et al. |

(Continued)

FOREIGN PATENT DOCUMENTS

| DE | 202010005863 | 8/2010 |
| EP | 2159780 | 3/2010 |

(Continued)

OTHER PUBLICATIONS

Louis Lerman et al., "Solid State Light Sheet Using Thin LEDs for General Illumination," U.S. Appl. No. 13/018,330, filed Jan. 31, 2011, 89 pages.

(Continued)

*Primary Examiner* — Douglas W Owens
*Assistant Examiner* — Minh D A
(74) *Attorney, Agent, or Firm* — Fish & Richardson P.C.

(57) ABSTRACT

A solid state lamp, such as one that can replace an incandescent light bulb, has a base portion having an electrical connector for connection to a source of power, such as an Edison-type connector for connection to the mains voltage. An AC/DC converter in the base converts the mains voltage to a suitable light emitting diode (LED) drive voltage. A plurality of receptacles on the base connects to electrodes of plug-in modules. Each plug-in module supports a plurality of low power LEDs connected in series. The strings of LEDs on different modules are connected in parallel when connected to the receptacles. The modules and base are configured to allow a user to operate the lamp with different combinations of modules to generate a desired light output from the lamp. For example, the user can recreate the lumens equivalent of a 20 W, 40 W, or 60 W bulb by using one, two, or three modules.

19 Claims, 6 Drawing Sheets

U.S. PATENT DOCUMENTS

| | | | |
|---|---|---|---|
| 6,693,551 B2* | 2/2004 | Pederson | 340/815.45 |
| 6,786,621 B2* | 9/2004 | Sviland | 362/351 |
| 6,876,143 B2 | 4/2005 | Daniels | |
| 6,936,855 B1 | 8/2005 | Harrah | |
| 7,052,924 B2 | 5/2006 | Daniels et al. | |
| 7,217,956 B2 | 5/2007 | Daniels et al. | |
| 7,259,030 B2 | 8/2007 | Daniels et al. | |
| 7,378,124 B2 | 5/2008 | Daniels | |
| 7,427,782 B2 | 9/2008 | Daniels et al. | |
| 7,476,557 B2 | 1/2009 | Daniels et al. | |
| 7,609,006 B2* | 10/2009 | Gibboney | 315/200 R |
| 7,745,838 B2 | 6/2010 | Lefevre | |
| 7,777,166 B2 | 8/2010 | Roberts | |
| 7,858,994 B2* | 12/2010 | Daniels | 257/88 |
| 8,058,659 B2 | 11/2011 | Bisberg | |
| 2002/0149933 A1 | 10/2002 | Archer et al. | |
| 2003/0160256 A1 | 8/2003 | Durocher et al. | |
| 2004/0189218 A1 | 9/2004 | Leong et al. | |
| 2005/0174769 A1 | 8/2005 | Yong et al. | |
| 2005/0207152 A1 | 9/2005 | Maxik | |
| 2005/0207156 A1 | 9/2005 | Wang et al. | |
| 2005/0265024 A1* | 12/2005 | Luk | 362/231 |
| 2006/0193130 A1 | 8/2006 | Ishibashi | |
| 2006/0221606 A1 | 10/2006 | Dowling | |
| 2007/0090387 A1 | 4/2007 | Daniels et al. | |
| 2007/0103066 A1 | 5/2007 | D'Andrade et al. | |
| 2007/0126354 A1 | 6/2007 | Chao | |
| 2007/0228999 A1 | 10/2007 | Kit | |
| 2007/0241355 A1 | 10/2007 | Chua | |
| 2008/0079012 A1 | 4/2008 | Grote et al. | |
| 2008/0080163 A1 | 4/2008 | Grote, III et al. | |
| 2008/0080200 A1 | 4/2008 | Robbins et al. | |
| 2008/0089069 A1 | 4/2008 | Medendorp | |
| 2008/0238338 A1* | 10/2008 | Latham et al. | 315/294 |
| 2008/0238649 A1* | 10/2008 | Arszman et al. | 340/471 |
| 2009/0046457 A1 | 2/2009 | Everhart | |
| 2009/0114928 A1 | 5/2009 | Messere et al. | |
| 2009/0195787 A1 | 8/2009 | Granados et al. | |
| 2009/0237916 A1 | 9/2009 | Park | |
| 2009/0261357 A1 | 10/2009 | Daniels | |
| 2009/0261743 A1 | 10/2009 | Chen et al. | |
| 2010/0044589 A1* | 2/2010 | Garcia et al. | 250/492.1 |
| 2010/0084665 A1 | 4/2010 | Daniels et al. | |
| 2010/0097798 A1 | 4/2010 | Young | |
| 2010/0102729 A1 | 4/2010 | Katzir et al. | |
| 2010/0128478 A1 | 5/2010 | Anderson | |
| 2010/0164344 A1 | 7/2010 | Boerner et al. | |
| 2010/0220046 A1 | 9/2010 | Plotz et al. | |
| 2010/0308353 A1 | 12/2010 | Grabowski et al. | |
| 2010/0317132 A1 | 12/2010 | Rogers et al. | |
| 2011/0026253 A1 | 2/2011 | Gill | |
| 2011/0050073 A1 | 3/2011 | Huang | |
| 2011/0069487 A1 | 3/2011 | Ng et al. | |
| 2011/0133658 A1 | 6/2011 | Sauerlaender | |
| 2011/0170288 A1* | 7/2011 | Kim | 362/235 |
| 2011/0260741 A1 | 10/2011 | Weaver et al. | |
| 2011/0267560 A1 | 11/2011 | Usukura | |
| 2011/0298371 A1 | 12/2011 | Brandes et al. | |

FOREIGN PATENT DOCUMENTS

| | | |
|---|---|---|
| JP | 61-198690 | 9/1986 |
| JP | 08-018105 | 1/1996 |
| WO | WO 2005/090852 | 9/2005 |
| WO | WO2005/099310 | 10/2005 |
| WO | WO 2007/149362 | 12/2007 |
| WO | WO 2009/063655 | 5/2009 |
| WO | WO 2009/149263 | 12/2009 |

OTHER PUBLICATIONS

"A Breakthrought in LED Technology," Lightsheet™ versus the other LED Manufacturing Technology, Lightsheet, Articulux, Articulated Technologies web page downloaded on Aug. 27, 2010 from http://www.buylightsheet.com/how, html, 1 page.

"Why pay for the lamp when you just need the light?," Lightsheet, Articulux, Articulated Technologies web page downloaded on Aug. 27, 2010 from http://www.buylightsheet.com/, 1 page.

LED Bulb with 5W Power Consumption. product description, downloaded on Nov. 22, 2010 from http://www.best-b2b.com/Products/867/890-2/led-bulb-with-5w-power-consumption_417 . . . pp. 1-2.

James Gourlay et al., "74.2: High Efficiency Hybrid LED Backlight for Large-area LCD TV," 2010 SID Digest, pp. 1097-1099.

James Gourlay et al., "79.4: Light-Rolls: High Throughput Manufacture for LED Lighting and Displays," SID 2010 Digest, pp. 1184-1187.

S. W. Rickly Lee et al., "Process Development and Prototyping for the Assembly of LED Arrays on Flexible Printed Circuit Tape for General Solid State Lighting," 2009 IEEE, 2009 Electronic Components and Technology Conference, pp. 2137-2142.

Konstantinos A. Sierros et al., "59.2: Durable Solid State Flexible LED Devices," SID 2010 Digest, pp. 882-885.

Vergoosen, Invitation to Pay Additional Fees in PCT/US2011/049233 dated Dec. 22, 2011, 7 pages.

"Competitive Advantage of L1GHTSHEET™ Technology," Articulated Technologies white paper, Oct. 2008, 4 pages.

* cited by examiner

SOLID STATE LAMP USING MODULAR LIGHT EMITTING ELEMENTS

FIELD OF THE INVENTION

This invention relates to a solid state lamp, such as a lamp using light emitting diodes (LEDs), and, in particular, to a solid state lamp whose light output is selectable and replaceable.

BACKGROUND

A huge market for LEDs is in replacement lamps for standard, screw-in incandescent light bulbs, commonly referred to as A19 bulbs, or less formally, A-lamps. The letter "A" refers to the general shape of the bulb, including its base, and the number 19 refers to the maximum diameter of the bulb in eighths of an inch (e.g., 2⅜" diameter). Such a form factor is also specified in ANSI C78-20-2003. Therefore, it is desirable to provide an LED lamp that has the same screw-in base as a standard light bulb and approximately the same size diameter or less. Additional markets exist for replacing other types of standard incandescent bulbs with longer lasting and more energy efficient solid state lamps.

Typical LED lamps having an A-shape use high power LEDs in order to use as few LEDs as possible to achieve the desired lumen output (e.g., 600-1000 lumens). Such LEDs may each draw a current greater than 300 mA and dissipate 1 W or more. Since the LED dies are on the order of about 1 $mm^2$, adequate heat removal is difficult. The high power LED junction temperatures should typically be kept under 125° C. to ensure the LEDs remain efficient and have a long life. A common design is to mount high power LEDs on a flat, heat conductive substrate and provide a diffusive bulb-shaped envelope around the substrate. The power supply is in the body of the lamp. Removing heat from such designs, using ambient air currents, is difficult since the lamp may be mounted in any orientation. Metal fins or heavy metal heat sinks are common ways to remove heat from such lamps, but such heat sinks add significant cost and have other drawbacks. It is common for such LED replacement lamps to cost $30-$60. Additionally, the light emission produced by such a solid state bulb is unlike that of an incandescent bulb since all the LEDs are mounted on a relatively small flat substrate. This departure from the standard spherical distribution patterns for conventional lamps that are replaced with LED replacement lamps is of particularly concern to the industry and end users, since their existing luminaires are often adapted to spherical light emission patterns. When presented with the typical "hemi-spherical" type emission from many standard LED replacement lamps, there are often annoying shadow lines in shades and strong variations in up/down flux ratios which can affect the proper photometric distributions thereby frustrating the photometric function of the luminaire.

Additionally, the base of the conventional solid state bulb contains the relatively expensive drive electronics, and a commercial seller of such lamps must stock lamps of various brightness levels (e.g., 40 W, 60 W equivalents) to satisfy the differing needs of the consumers.

In the field of compact fluorescent lamps, there is usually a base which contains the electrical conversion electronics (ballast) and a twisted glass tube structure that is permanently attached to the base of the lamp. The life expectancy of the typical compact fluorescent lamp is about 5000 to 15,000 hours, and it is usually the failure of the fluorescent tube that signals the end of life for the lamp. Unfortunately, the electronic ballast in the base is usually still viable but because they are permanently joined, the entire lamp is usually thrown out and, in many cases, without regards to the toxic metals and other materials inherent with these lamps. This practice is further environmentally unsound since it is possible that the ballast in the base of the typical compact fluorescent lamp could conceivably last several times longer than the fluorescent tube it is powering.

What is needed is a new approach for a solid state lamp that can replace a variety of standard incandescent and compact fluorescent lamps having different wattages. Such a solid state lamp preferably allows adequate heat to be removed without significant added cost or added weight and overcomes other drawbacks of prior art solid state lamps and also significantly improves the environmental limitations of the prior art incandescent, compact fluorescent, and solid state lamps.

SUMMARY

In one embodiment, a solid state lamp may replace a standard incandescent bulb having an Edison-type screw-in connector. The solid state lamp includes a base comprising an electrical connector, a power converter for converting the mains voltage into a suitable LED drive voltage, and a support area having a plurality of sets of receptacles for plug-in modules containing LEDs. Each plug-in module may be a flat module containing an array of LEDs connected in series, where the module mounts perpendicular to the surface of the base. The light emitted from a single module may be bidirectional.

Each module may produce light equivalent to a 20 W bulb. In one embodiment, there are three receptacles on the base arranged 120 degrees apart. The lamp can therefore produce sufficient lumens to replace either a 20 W, 40 W, or 60 W bulb. The user may purchase a single base and have the option for any of the three brightness levels.

Other embodiments of the modules may be wedge-shapes, were the LEDs are mounted on the outer wall of the wedge.

Other embodiments of the modules could also have wedge shapes that are optical structures where the LEDs are mounted in the lower extremity and the light is guided via total internal reflection upwards and extracted outwards in a desired pattern emulating a lamp.

In one embodiment, the modules are transparent or reflective planes, each side of a plane supporting one or more flexible LED strips for light emission in generally opposite directions. Each strip encapsulates a string of low power (e.g., 20 mA), bare LED dies without wire bonds. The strips are thin, allowing heat to be transferred through the surface of the strips to ambient air and to the planes. Therefore, there is a low heat-producing large surface area contacted by ambient air.

In one embodiment, to replace a 60 W incandescent bulb, there are a total of 12 LED strips affixed to the surfaces of three planes, each strip having 12 LEDs in series for generating a total of 800-900 lumens. The 12 strips are driven in parallel. The LEDs may be driven at a low current so as to generate very little heat, and are spread out over a relatively large bulb surface, enabling efficient cooling by ambient air.

Each module may have two or more electrodes for driving the one or more strips affixed to its surface.

By using unpackaged LED dies in the strips, and using traces in the strips to connect the dies in series, the cost of each strip is very low. Using bare LED dies in the strips, compared to packaged LEDs, reduces the cost per LED by 90% or more, since packaging of LED chips to mount them in a sealed surface mount package is by far the largest contributor to an LED's cost.

White light may be created by using blue LEDs in conjunction with a phosphor or combinations of phosphors or other light converting materials in either proximate or remote configurations. Light emitting dies other than LEDs may also be used, such as laser diodes.

Many other lamp structures are envisioned. For example, the strips may have sufficient mechanical integrity to not require being affixed to a rigid form. In one embodiment, a plurality of plug-in strips extends from a base and the strips are bendable by the user to have any shape and to produce a customized light emission pattern.

Another embodiment could also employ strips that could have asymmetric distributions on opposing sides, with one side offering the benefit of narrow emission as in a spot light and the other offering diffuse light emission. The combination of strips can be further mixed and matched at the user's discretion to provide for diffuse emission in some strips and for directional spot lighting from other strips such that the overall bulb can exhibit dramatically different photometric behaviours within a single unit. The benefits from such a construction completely free the user in terms of what is defined as a bulb, since the properties of many types of bulb can be engaged within a single unit thereby increasing almost infinitely the number of possible light distribution patterns that could be created.

Furthermore, the ability to vary distribution and correlated colour temperature or chromaticity is also afforded by this design since users could then elect to have for example, some strips that contain directional spots with low color temperature while adjoining strips could offer diffuse light emission at higher color temperature or another chromaticity.

The resulting solid state lamp has an efficiency that is much higher than an incandescent bulb for the same lumens output, and much less heat is generated. Additionally, since the LEDs are spread over a relatively large exposed surface, heat is adequately removed in any orientation of the lamp. Other advantages exist.

Many other embodiments are described.

BRIEF DESCRIPTION OF THE DRAWINGS

Elements that are the same or similar in the various figures are identified with the same numeral.

DETAILED DESCRIPTION

Figure 1:
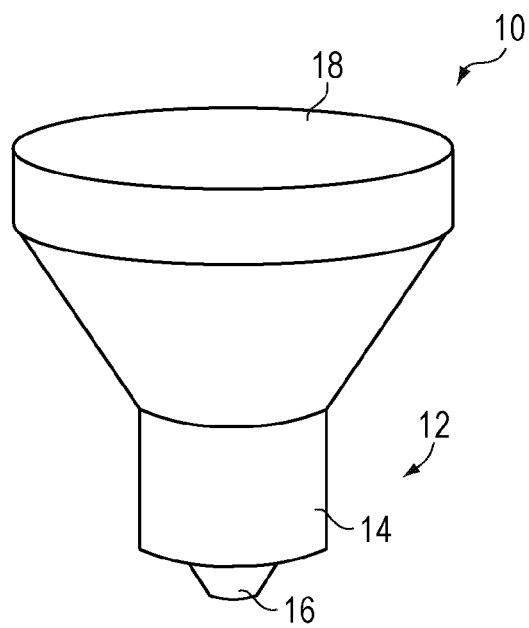
FIG. 1 is perspective view of a base of a solid state lamp that can receive a plurality of modules containing LEDs, in accordance with one embodiment of the invention.

FIG. 1 illustrates a base 10 of a solid state lamp. The base 10 includes an electrical connector 12, which may be an Edison-type screw-in connector for connection to the mains voltage or may be any other type of electrical connector. The top portion 14 of the connector 12 may have threads for connection to the neutral terminal of a conventional socket, and the bottom portion 16 may be the hot electrode.

An AC/DC converter is housed in the base 10 for converting the 120V AC mains voltage to around 40 volts DC to drive the LED modules, described later.

The base 10 body may be formed of ceramic or other type of thermally conductive insulating material.

The top surface 18 of the base 10 is provided with multiple plug-in receptacles for receiving a plurality of LED modules.

Figure 2:
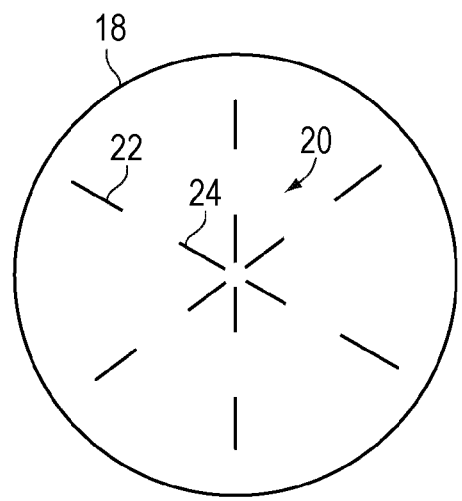
FIG. 2 is a top down view of the top support surface of the base, showing a possible arrangement of receptacles for the plug-in modules.

FIG. 2 is a top down view of the top surface 18 showing six sets of receptacles 20 for physically supporting the LED modules and providing drive current to the LED modules. Each set of receptacles 20 may include a positive voltage terminal 22 and a negative voltage terminal 24 or alternatively, a line and neutral terminal. The module electrodes may be blades, posts, or any other form of connector. The receptacles 20 are oriented radially; however, other orientations of the receptacles 20 may also be used, such as columns of receptacles or receptacles along the periphery of the base 10.

Figure 3A:
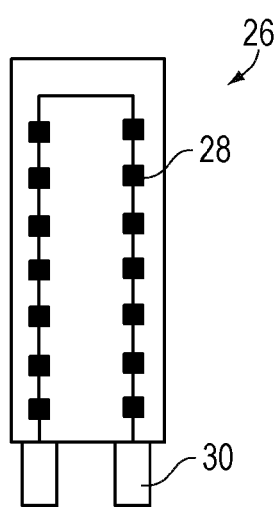
FIG. 3A is a front view of a plug-in module containing LEDs that generate light equivalent to a 20 W incandescent bulb.

FIG. 3A is a front view of one type of plug-in module 26. In one embodiment, the module 26 supports 10-14 LEDs 28 in series so they can be driven with a voltage of 40 volts or less. The module 26 is shown having two blade electrodes 30. In another embodiment, there is an additional set of LEDs on the reverse side of the module 26 connected to another pair of electrodes or connected in parallel with the front set of LEDs. The height of the module 26 may be, for example, 2-3 inches, so the lamp will be approximately the same size as a 60 W incandescent bulb.

In one embodiment, each module 26 generates light equivalent to a 20 W incandescent bulb. Any number of modules from one to six can be plugged into the base 10 to provide the desired amount of lumens. The light is emitted approximately 360 around the lamp due to the wide (e.g., Lambertian) light emission from each LED. Each module 26 may also include a reflector layer to further mix and spread the light output.

Figure 3B:
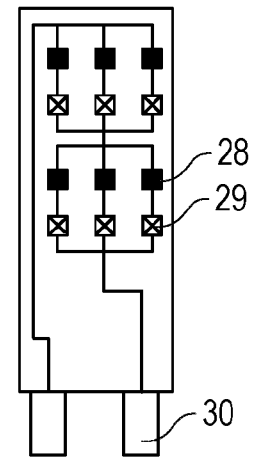
FIG. 3B is a front view of an alternative plug-in module containing LEDs in a series/parallel circuit arrangement with additional current control devices in series with each LED and a higher density of LEDs in an arbitrary region (top illustrated) to increase flux density.

FIG. 3B is a front view of an alternative module that illustrates a series and parallel arrangement of LEDs for use on a lower DC voltage. The LEDs 28 are shown in series with a current control devices 29, which could be resistors or other current control blocks to control individual string currents. FIG. 3B also illustrates the general concept that the LEDs may be arrayed in any arbitrary way such as in an increased density near the top of the module to concentrate more light within this region.

Figure 4A:
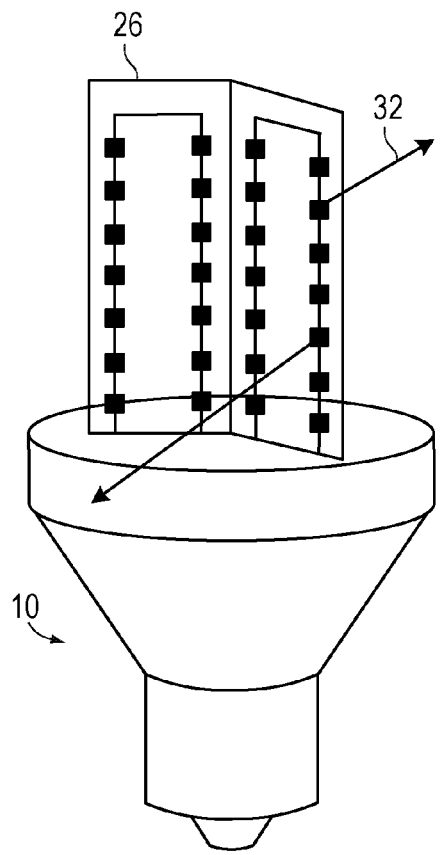
FIG. 4A illustrates two modules plugged into the base of FIG. 1 for providing a light emission 360 degrees around the lamp.

FIG. 4A illustrates two modules 26 plugged into the base 10. Light rays 32 are shown being emitted to illustrate that the modules may emit light from both sides to provide 360 degrees of light emission. FIG. 4A also illustrates that the directional and distribution properties of the light from each side of the module may be different to suit different applications. For example, one side may be designed to produce highly directional emission while the other side is designed to produce a diffuse pattern.

Figure 4B:
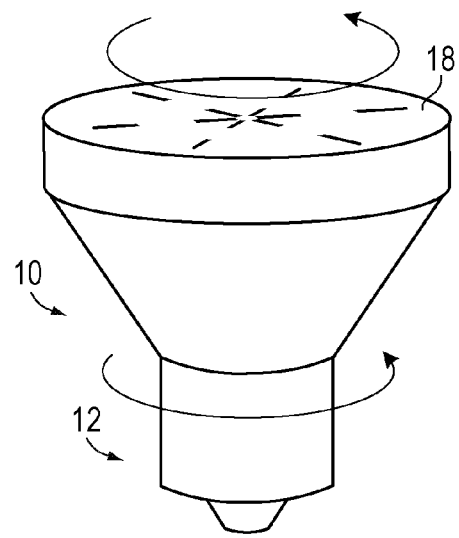
FIG. 4B illustrates how the base and socket may be rotationally connected such that the array of modules can be rotated and locked into place once the lamp is screwed into a standard socket.

FIG. 4B illustrates that the upper part of the base 10 may also be rotationally attached to the connector 12 (or any lower part of the base 10) to allow the upper part (supporting the modules) to be turned relative to the fixed position of the socket once the lamp is engaged with the socket. This rotational motion may also include mechanical damping or even a locking mechanism between the top surface 18 and the connector 12 that will permit the emission pattern generated by the modules to be turned and locked in position towards a desired direction such as in a wall sconce or other type of asymmetric type of luminaire.

Figure 4C:
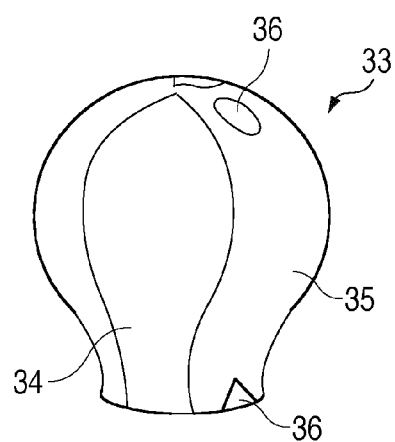
FIG. 4C illustrates an optional domed diffuser with a number of functions shown.

FIG. 4C illustrates an optional domed diffuser 33, such as plastic, that may be installed over the modules 26 and affixed to the base 10 to further diffuse the light and protect the modules 26. The diffuser may have openings 36 to allow ambient air to flow through it for cooling in all orientations of the lamp. Furthermore, the domed diffuser may include translucent areas 35 mixed with transparent areas 34 in a variety of useful patterns as may be used to permit more or less diffusion to intersect various of the internal module light emission patterns.

In one embodiment, the single base 10 can support a variable number of modules 26 to generate a selectable amount of light equivalent to an incandescent light bulb of 20 W, 40 W, 60 W, 80 W, 100 W, or 120 W. Due to the use of low power LEDs (e.g., 20 A) spread over a relatively large surface that is exposed to ambient air, there is no problem dissipating heat, unlike conventional LED "bulbs" using a few high power LEDs mounted on a flat substrate. Additionally, the arrangement of the modules 26 creates a 360 degree light emission that better emulates that of an incandescent or compact fluorescent bulb.

Figure 5:
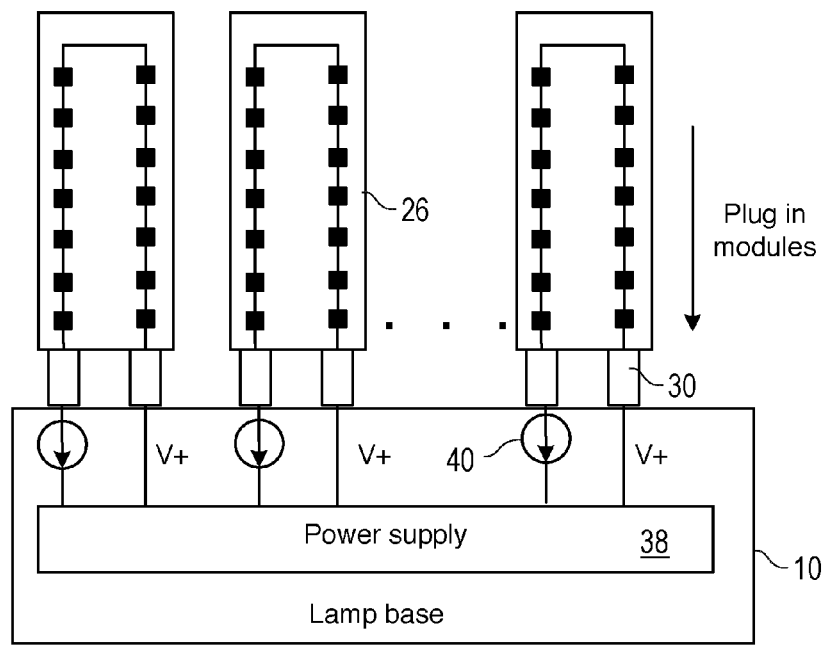
FIG. 5 is a schematic diagram illustrating the power supply in the base driving three modules.

FIG. 5 illustrates how the plug-in modules 26 are connected in parallel to the power supply 38. Each module 26 may have one electrode connected to a positive voltage and another electrode connected to a constant current source 40. Modules as in FIG. 3B may also be used where constant current sources 40 may be optional since each module may include its own on-board current limiting and control means. In another embodiment of FIG. 5, a controller is included in power supply 38 that is in electrical communication with current sources 40 that enables sub-lamp control of the modules. Further, this controller could be enabled to respond to external data sources via wireless, power line carrier or free space optical communications to enable the lamp to respond to user requirements or active load shedding or other requirement.

If there are a sufficiently large number of LEDs connected in series, the LEDs may be driven from the AC mains voltage without an AC/DC converter, reducing the cost of the lamp and the heat generated. Furthermore, high frequency types of AC conversion transformers may also be employed that generate lower AC voltages to also create suitable drive conditions for the LEDs. These compact AC conversion sources often operate at a high frequency beyond the flicker fusion frequencies or electrochemical response thresholds for human vision thereby eliminating any concerns for flicker that have plagued many prior art LED bulbs.

In recent presentations from the US Department of Energy, there is also the potential for the LEDs in the lamp to be driven directly from a DC grid within the luminaire or dwelling with the aid of current limiting active and/or passive devices. The incorporation of a direct DC grid system would be advantageous for safety and thermal purposes as the voltage to the bulb will likely be within the "Safe Extra Low Voltage" (SELV) regime where the added efficiency of not having to convert voltages and currents will result in significantly more efficient drive electronics and less damaging heat accumulation in the lamp.

Figure 6A:
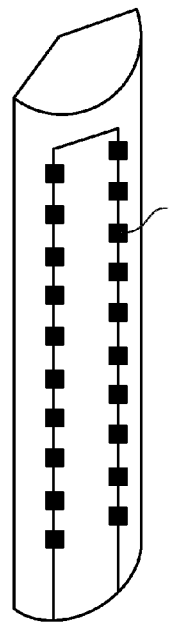
FIG. 6A illustrates a wedge-shaped module.

The modules can take many different forms. FIG. 6A illustrates a wedge-shaped module 42 having LEDs arranged around an outer wall of the module 42. Additional LEDs may be mounted on the sides of the module 42.

Figure 6B:
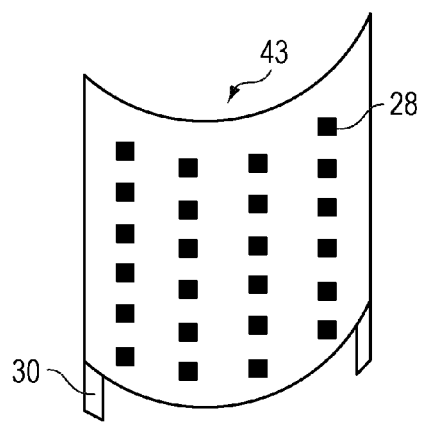
FIG. 6B illustrates a bent light sheet module.

FIG. 6B illustrates a thin, bent light sheet forming a module 43, containing any number of LEDs in series or series/parallel combinations as may be suited to the supply voltage.

Figure 6C:
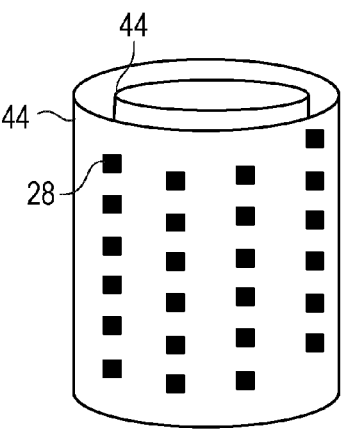
FIG. 6C illustrates concentric cylindrical modules.

FIG. 6C illustrates that the light sheets may be formed in concentric cylinders 44. Since the light sheets may be transparent, light from an inner cylinder will pass through an outer cylinder. Each outer cylinder may provide more lumens than an inner cylinder if it supports more LEDs. Low temperature anti-reflective coatings could also be used on the transparent sheets to increase the transmission through the sequential cylinders. The chromaticity of the inner cylinder may be different from that of the outer cylinder and, as disclosed with respect to FIG. 5, could be enabled to provide for differential control of chromaticity. An example of this may be to afford a useful change in chromaticity towards a higher correlated color temperature to increase visual clarity for the aging eye at one time and to be capable of gently dimming down to a warmer environment with a lower correlated color temperature at a different time such that the light is similar to the appearance of a dimmed incandescent lamp.

In all of the module forms, it is also implied in their designs that wiring choices for LEDs and distribution of LEDs and optical structures are advantageously free for adjustment such that light bulb optical distributions, flux outputs, chromaticities and many other variables are freely available in manufacturing and utilization to suit a variety of applications and luminaires.

Figure 7A:
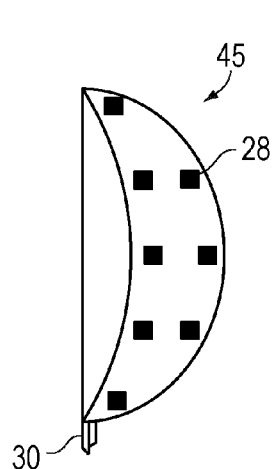
FIG. 7A is a perspective view illustrating another embodiment of a wedge-shaped module.

FIG. 7A is a perspective view illustrating another embodiment of a wedge-shaped module 45, similar to an orange wedge. The module 45 has serially and/or serial parallel connected LEDs 28 distributed on its surface to emit light throughout a broad angle, such as over 180 degrees vertically and horizontally. Electrodes 30 are inserted into associated receptacles on the surface of the lamp base 10 similar to FIG. 1.

Figure 7C:
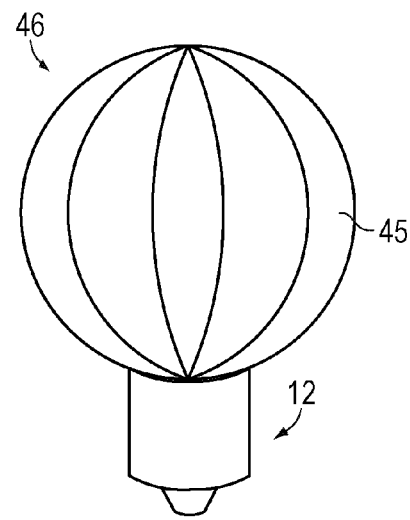
FIG. 7C is a perspective view illustrating a lamp fully populated with the modules of FIG. 7A.
Figure 7B:
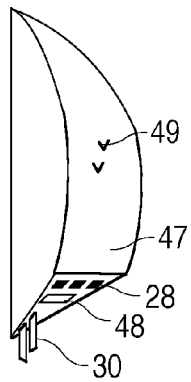
FIG. 7B is a perspective view illustrating another embodiment of the wedge-shaped module that has light injected into it from near the base.

FIG. 7B is a perspective view illustrating another embodiment of the wedge-shaped module, similar to an orange wedge. This module instead utilizes a smaller number of LEDs located near the base to inject light into a light guiding and extracting wedge 47 or sheet. As light is guided along, it is preferentially extracted along its length and emitted to the outer area. The connection between the wedge and the base provides the thermal and electrical coupling for the LED(s). The LED or LEDs near the base are coupled into the wedge 47 via an optical structure such as lenses or a reflector that efficiently directs and couples the light into the wedge 47. Surface extraction features 49 are introduced into the wedge 47 to cause light to be emitted along its length. A controller 48 or other active device can be used to control the brightness of the LEDs.

FIG. 7C is a perspective view illustrating a lamp 46 fully populated with the modules 45 of FIG. 7A or FIG. 7B. Any number of identical modules 45 may be plugged into the lamp 46 and connected in parallel. Each module 45 may have its own current source. In one embodiment, there are a maximum of 12 modules 45. In another embodiment, there are a maximum of eight modules 45. For a 12-module lamp, it is possible to have symmetrical lighting 360 degrees around the lamp with 3, 4, 6, 8, 9, or 12 modules 45. The modules 45 are spaced a maximum amount from each other. If the total of 12 modules 45 has a light output equivalent to a 100 W incandescent bulb (about 1200 lumens), each module 45 would emit around 100 lumens. This would require about 20-30 low power LEDs 28 per module 45, arranged in two parallel columns for a simple series arrangement.

Figure 7D:
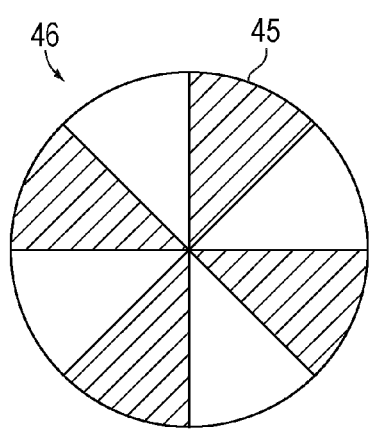
FIG. 7D is a top down view illustrating eight module positions in the lamp and only four positions contain modules.

FIG. 7D is a top down view illustrating eight module positions in the lamp and only four positions contain modules 45. The lambertian emission by each LED 28 and the mixing of the light beyond a few inches emulates the light emitted by a standard bulb.

Figure 7E:
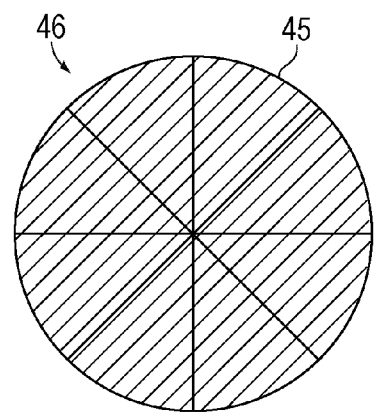
FIG. 7E illustrates all eight positions containing modules for maximum brightness.

FIG. 7E illustrates all eight positions containing modules 45 for maximum brightness. For an eight-position lamp, symmetrical lighting is obtained using 2, 4, or 8 modules 45. In another embodiment, there are only six module positions. Other numbers of positions are also envisioned.

The wedge-shaped modules 45 may be hollow to improve heat dissipation. The hollow wedges may be transparent to pass light from other wedges or bidirectionally emit light to increase the uniformity of light emission around the lamp.

FIGS. 8-16 illustrate various types of light sources for the modules.

Figure 8:
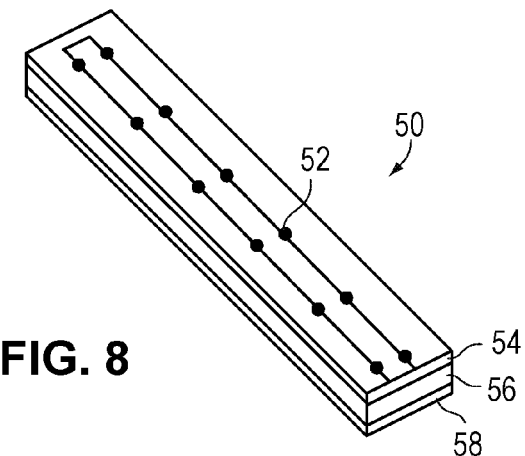
FIG. 8 is a perspective view of a portion of an LED strip that can be used in the various modules.

FIG. 8 illustrates a simplified module 50 having a plurality of layers. Bare LEDs 52 (dies) are encapsulated by sandwiching the LEDs 52 between a transparent top substrate 54 and one or more bottom substrates 56. A reflector layer 58 may be used to increase the extraction of light. The light source may be provided as strips of LEDs in series, and the strips are affixed to a rigid support, if needed for structural integrity, to form the module. The support may be transparent plastic or reflective, or may be formed of any other material. The LED strips may be on the order of 1-2 mm thick and highly flexible.

Figure 9:
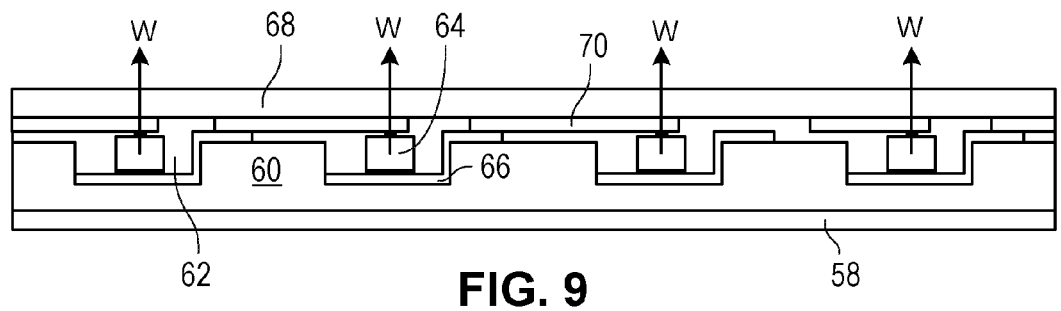
FIG. 9 is a cross-sectional view of a portion of an LED strip, where the LEDs are connected in series.

FIG. 9 is a cross-sectional view of one type of light strip. In FIG. 9, the bottom substrate 60 has cavities 62 molded in it or grooves molded in it. Grooves may also be formed by extruding, machining, or injection molding the substrate 60. Instead of cavities, an intermediate layer with holes formed in it may be used. The width of the strip may be sufficient to support one, two, three, or more columns of LEDs 64 connected in series or any combination of series and parallel connections as desired.

Cathode conductors 66 are formed on the bottom substrate 60 and are bonded to the cathode electrodes of the vertical LEDs 64.

A top substrate 68 has cathode conductors 70 that are aligned with the cathode electrodes of the LED 64 and also make contact with the anode conductors 66 to connect the LEDs 64 in series. The area around each LED 64 may be filled in with a phosphor/silicone mixture to encapsulate the LEDs 64, or just silicone may be used as the encapsulant and the top surface of the top substrate 68 is coated with a layer of phosphor to create white light.

A thin layer of silicone or other adhesive may be applied on the top substrate 68 or bottom substrate 60, except where the conductors are located, to affix the substrates to each other and to fill in any gaps between the two substrates. Alternatively, lamination may be achieved by use of other adhesive materials, ultrasonic bonding, laser welding, or thermal means. A conductive paste or adhesive may be deposited over the cathode conductors 70 to ensure good electrical contact to the anode conductors 66 and LEDs' cathode electrodes. A phosphor tile or layer may be formed on the top substrate 68 for creating white light from the blue light emitted vertically from the chip 64. An optional reflective layer 58 is formed on the bottom substrate 60 for reflecting light toward the output surface.

Instead of the groove or cavity being formed in the bottom substrate 60, the groove or cavity may be formed in the top substrate 68, or partial-depth grooves or cavities may be formed in both substrates to account for the thickness of the LEDs 64.

If the LEDs are very thin, such as less than about 200 microns, the thickness of the LEDs may be accommodated by deformation of the substrates around the LEDs. The top substrate 68 may be heated and softened when laminating it over the bottom substrate 60 to conform the substrates to the LEDs 64 for adequate encapsulation.

Figure 10:
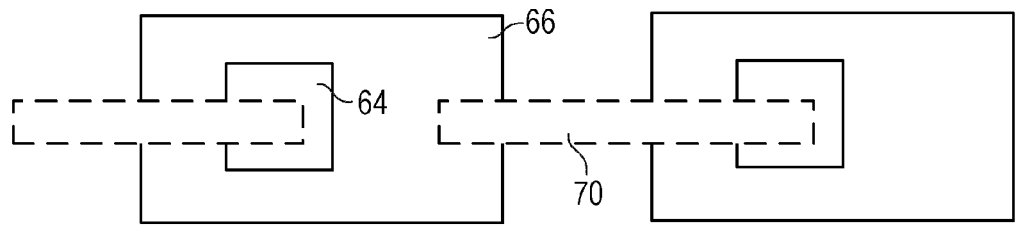
FIG. 10 is a magnified top down view of FIG. 9 showing how the LEDs are connected in series by conducting traces on the substrates sandwiching the bare LEDs.

FIG. 10 is a transparent top down view of FIG. 9 illustrating one possible conductor pattern for the conductors 66 and 70, where the LEDs 64 are connected in series. The cathode conductors 70 above the LEDs 64 are narrow to block a minimum amount of light. The various metal conductors in all embodiments may be reflective so as not to absorb light. Portions of the cathode conductors 70 over the LEDs 64 may be transparent conductors. Parallel connections and variations thereof can be provided in a similar manner by adjusting the trace layouts.

Figure 11:
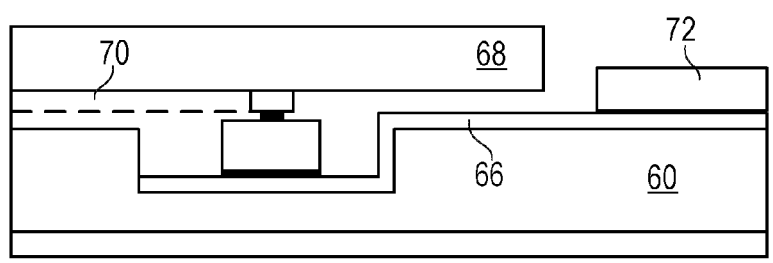
FIG. 11 is a cross-sectional view of the end of an LED strip showing how the metal leads of the strip can be terminated for attachment to a module's electrodes.
Figure 12:
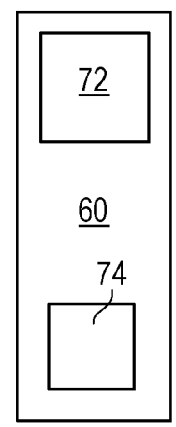
FIG. 12 is a top down view of the end of the LED strip of FIG. 11 showing termination pads of the strip.

At the end of each series string of LEDs, the anode and cathode conductors on the substrates must be able to be electrically contacted for connection to a current source or to another string of LED chips, whether for a series or parallel connection. FIG. 11 illustrates an end of a sheet or strip, where the bottom substrate 60 extends beyond the top substrate 68, and FIG. 12 is a top down view of the end of the bottom substrate 60. The ends of the conductors 66 and 70 are electrically connected to rugged terminal pads 72 and 74

(FIG. 12) of the LED strip, which are electrically connected to the electrodes 30 (FIG. 3) of the module 26.

Figure 13:
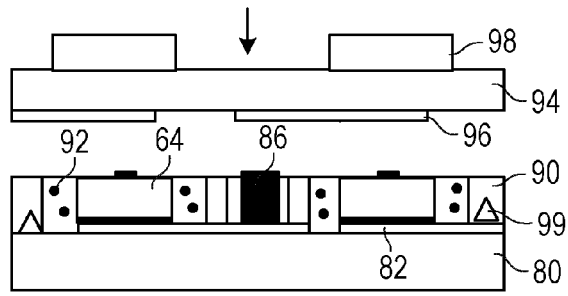
FIG. 13 is a cross-sectional view of a portion of another embodiment LED strip, where the LEDs are connected in series via a conductive link.

FIG. 13 represents an embodiment where the bottom substrate 80 has conductors 82 formed on its top surface. The bottom electrodes (e.g., anodes) of the LEDs 64 are bonded to the conductors 82. For a series connection between LEDs 64, solid metal interconnectors 86 are also bonded to the conductors 82. An intermediate sheet 90 has holes that correspond to the LED 64 locations and interconnector 86 locations, and the tops of the LEDs 64 and interconnectors 86 are approximately planar with the top of the intermediate sheet 90. The areas surrounding the LEDs 64 may be filled in with a phosphor/silicone mixture 92. A transparent top substrate 94 has cathode conductors 96 that interconnect the cathode electrodes of LEDs 64 to associated interconnectors 86 to create a series connection between LEDs 64. This series interconnection technique may connect any number of LEDs 64 in series in the sheet or strip. A pick and place machine is simply programmed to place an LED 64 or an interconnector 86 at selected locations on the bottom substrate 80. The bonding may be performed by ultrasonic bonding, conductive adhesive, solder reflow, or any other technique.

The interconnector 86 may also be a plating of the hole in the intermediate sheet 90 or a soft conductor paste that is injected into the hole, printed within the hole, etc.

The interconnector 86 may also be any of a variety of active or passive components as may be dictated by the drive and control circuitry. There are known to be many compact passive and active components (e.g., transistor switches) that can be produced in sufficiently small sizes that could be directed to use in place of the interconnector 86.

A phosphor layer or tile 98 may be affixed on the top substrate 94 over the LEDs 64 to convert the blue light emitted from the top surface of the LEDs 64 to white light. If the phosphor layer/tile 98 was large enough, then phosphor need not be used in the encapsulant.

The bottom substrate 80 may have a reflective layer either imbedded in it or on its bottom surface, as previously described, for reflecting light toward the light output surface. Optionally, internal reflectors 99 may be directed to reflect light upward.

In a related embodiment, the hole for the interconnector may be formed completely through the light sheet, then filled with a metal or coated with a metal. The hole may be formed using a laser, mechanical punch, or other means. The metal may be a printed solder paste that is reflowed to make electrical contact to the conductors formed on the substrates to complete the series connection. Extending the metal external to the light sheet will improve heat sinking to ambient air or to an external heat sink material. If the metal has a central hole, cooling air may flow through it to improve convective cooling.

It may be desirable for the light strips to provide bidirectional light rather than affix an LED strip to both sides of a module.

Figure 14:
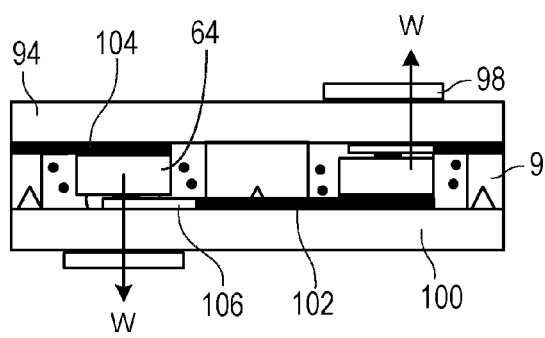
FIG. 14 is a cross-sectional view of a portion of an LED strip where light is bidirectionally emitted.

FIG. 14 illustrates how the LEDs 64 may be mounted on the bottom substrate 100 in alternating opposite orientations (anode up, then cathode up) so light is emitted in generally opposite directions from the LED strip. The conductors 102 and 104 connect the LEDs 64 in series. The cathode electrodes 106 may be transparent since light is emitted from the cathode side of the LED, having a small electrode. The anode side of the LED is typically covered with a large reflective contact.

Figure 15:
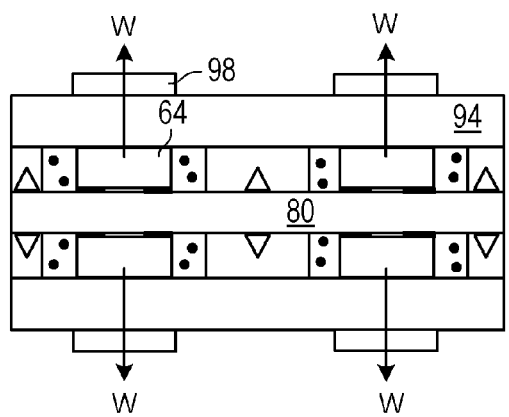
FIG. 15 is a cross-sectional view of a portion of another embodiment of an LED strip where light is bidirectionally emitted.

FIG. 15 illustrates that two LED strips may be affixed back to back or share a common substrate to generate bidirectional light.

Figure 16:
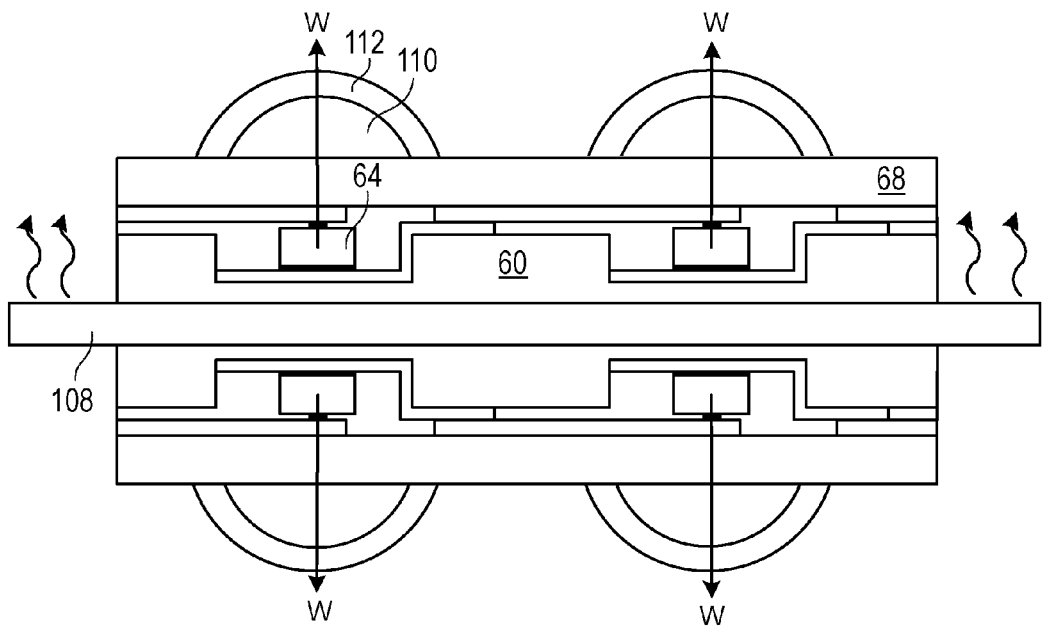
FIG. 16 is a cross-sectional view of a portion of yet another embodiment of an LED strip where light is bidirectionally emitted.

FIG. 16 illustrates two LED strips similar to FIG. 9 affixed back to back and sharing a common metal heat sink layer 108, to generate bidirectional light. The heat sink layer provides structural support and extends beyond the LED strips to be cooled by ambient air.

Lenses 110 may be formed over the LEDs 64 to control the light emission. A phosphor layer 112 is shown over the lenses 110 to produce white light.

Reflectors (not shown) may also be used to surround lenses 110 to provide for directed light emission similar to a reflector lamp.

It is also understood that the choice of lens, lens and reflector, or planar diffuse emission, or any other type of optical management can both be mixed on any one side of the sheet as desired or be directed be exclusively on one side such that each side of the sheet can have a different light distribution intensity pattern.

Many other types of light sources may be used for any of the modules described herein.

The lamp may have virtually any shape. By providing a common base and plug-in modules, only a single base needs to be purchased for a variety of possible brightnesses, chromaticities, and light distribution patterns. The resulting lamp emits light, especially using a dome diffuser, that better emulates an incandescent or compact fluorescent bulb, compared to prior art solid state lamps using high power LEDs mounted on a flat base. Cooling the LEDs using the present embodiments requires no large metal heat sinks. Other advantages exist.

The inventions can be applied to any form of lamp having any type of electrical connector. The lamps may run off the mains voltage or a battery. If a battery is the power supply, the selection of the number of LEDs in a strip (determining the voltage drop) may be such that there is no power supply needed in the lamp.

The various features of the lamps described herein may be combined in any way.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A solid state lamp comprising:
   a base portion having an electrical connector for connection to a source of power;
   a plurality of modules, each module of the plurality of modules comprising multiple light emitting diodes (LEDs), and
      two opposing surfaces through which the module emits light; and
   a plurality of receptacles on the base portion configured to receive the plurality of modules and to provide drive current to the multiple LEDs in each of the plurality of modules,
   wherein each module of the plurality of modules has electrical connectors to connect to associated receptacles on the base portion, the receptacles supporting the modules when the modules are electrically connected to the receptacles,
   wherein the modules and base portion are configured to allow a user to select a number of modules to connect to the base portion and to operate the lamp with different combinations of modules to generate a desired light output from the lamp.

2. The lamp of claim 1, wherein the multiple LEDs of each of the plurality of modules are connected in series.

3. The lamp of claim 2, wherein the multiple LEDs in different modules of the plurality of modules are connected in parallel when the different modules are electrically connected to the receptacles.

4. The lamp of claim 1, wherein each of the plurality of modules comprises a strip of multiple LEDs, connected in series, mounted on a support structure.

5. The lamp of claim 1, wherein each of the plurality of modules is a flat plane on which the multiple LEDs are mounted.

6. The lamp of claim 1, wherein each of the plurality of modules comprises LEDs arranged along an arc.

7. The lamp of claim 1, wherein each of the plurality of modules is wedge shaped and emits light in an arc.

8. The lamp of claim 1, wherein the plurality of modules includes identical modules.

9. The lamp of claim 1, wherein the plurality of modules comprise cylinders having different diameters so that the modules of the plurality can be concentrically mounted on the base portion when connected to their associated receptacles, wherein at least an outer module passes light from an inner module.

10. The lamp of claim 1, wherein light is emitted 360 degrees around the lamp by the plurality of modules.

11. The lamp of claim 1, wherein each of the plurality of modules contains multiple bare LEDs encapsulated by substrates.

12. The lamp of claim 1, wherein each of the plurality of modules contains at least 10 LEDs connected in series.

13. The lamp of claim 1, wherein there are at least three sets of receptacles on the base portion for supporting at least three modules of the plurality of modules.

14. The lamp of claim 1 wherein the electrical connector is an Edison-type screw-in connector.

15. The lamp of claim 1, wherein the plurality of modules have electrodes that plug into associated receptacles.

16. The lamp of claim 1, wherein each of the plurality of modules comprises a group of LEDs, wherein each group comprises:
a first substrate having first conductors;
a second substrate having second conductors; and
bare, unpackaged LED dies sandwiched between the first substrate and second substrate, wherein the first conductors and the second conductors connect the LED dies in each group in series.

17. The lamp of claim 1, further comprising a wavelength conversion material over the multiple LEDs of each of the plurality of modules to generate white light.

18. The lamp of claim 1 further comprising an AC/DC power converter in the base portion.

19. A method of controlling light output from a solid state lamp, the lamp comprising a base portion having an electrical connector to connect to a source of power, and a plurality of receptacles on the base portion to receive a plurality of modules, each module of the plurality of modules including (i) multiple light emitting diodes (LEDs), (ii) two opposing surfaces through which the module emits light, and (iii) electrical connectors to connect the module to an associated receptacle from among the plurality of receptacles on the base portion, the method comprising:
supporting the plurality of modules, each module having electrical connectors for connection to associated receptacles on the base portion, the receptacles
supporting, by the plurality of receptacles, the plurality of modules that are electrically connected to the plurality of receptacles; and
plugging in any of multiple combinations of the plurality of modules into the plurality of receptacles to generate a desired light output from the lamp.

* * * * *